United States Patent
Jess et al.

(10) Patent No.: US 7,924,307 B2
(45) Date of Patent: Apr. 12, 2011

(54) OPTICAL VIEWING SYSTEM AND METHOD FOR OPERATING THE SAME

(75) Inventors: Helge Jess, Oberkochen (DE); Ulrich Gold, Aalen (DE); Dieter Quendt, Essingen (DE); Christoph Hauger, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 1672 days.

(21) Appl. No.: 10/918,387

(22) Filed: Aug. 16, 2004

(65) Prior Publication Data

US 2005/0237384 A1    Oct. 27, 2005

(30) Foreign Application Priority Data

Aug. 14, 2003  (DE) .................... 103 37 795
Aug. 4, 2004   (DE) .................... 10 2004 038 001

(51) Int. Cl.
 *H04N 13/00* (2006.01)
 *H04N 13/02* (2006.01)
 *H04N 7/18*  (2006.01)

(52) U.S. Cl. .............. 348/42; 348/47; 348/79

(58) Field of Classification Search ............ 348/42, 348/47, 79
See application file for complete search history.

(56) References Cited

U.S. PATENT DOCUMENTS

| | | | | |
|---|---|---|---|---|
| 5,261,404 A * | 11/1993 | Mick et al. | ........ | 600/425 |
| 6,023,361 A * | 2/2000  | Ford et al. | ........ | 398/135 |
| 6,361,167 B1 * | 3/2002 | Su et al. | ........ | 351/206 |
| 6,483,948 B1 * | 11/2002 | Spink et al. | ........ | 382/255 |
| 2001/0024319 A1 | 9/2001 | Hauger et al. | | |
| 2002/0154315 A1 * | 10/2002 | Myrick | ........ | 356/451 |
| 2003/0016301 A1 * | 1/2003 | Aizaki et al. | ........ | 348/345 |

FOREIGN PATENT DOCUMENTS

DE    100 20 279      1/2001
DE    299 23 951     11/2001

OTHER PUBLICATIONS

"31.1: SXGA Resolution FLC Microdisplays", M. Birch et al, SID 02 Digest, 2002, p. 954-957.

* cited by examiner

*Primary Examiner* — Marsha D Banks Harold
*Assistant Examiner* — Chikaodili E Anyikire
(74) *Attorney, Agent, or Firm* — Walter Ottesen

(57) ABSTRACT

An optical viewing system (100) for viewing an object region has a display unit (105) which has a plurality of controllable display segments which make available color pulse sequences in order to generate a display image which is built up of a plurality of image points. The optical viewing system (100) includes a superposition unit (110) which superposes an image, which is made available by the display unit (105), onto the image of an object region (104). The optical viewing system has a camera unit (111, 113) to which the superposed image of display unit (105) and object region (104) is supplied. The camera unit (111, 113) has image sensors (112, 114) whose light sensitivity is adjustable as a function of time. The light sensitivity of the image sensors (112, 114) is matched to the color pulse sequence in such a manner that the image sensor (112, 114) can detect at least two light pulses of different color from the color pulse sequence from a display segment.

22 Claims, 7 Drawing Sheets

OPTICAL VIEWING SYSTEM AND METHOD FOR OPERATING THE SAME

CROSS REFERENCE TO RELATED APPLICATIONS

This application claims priority of German patent applications no. 103 37 795.6, filed Aug. 14, 2003, and no. 10 2004 038 001.5, filed Aug. 4, 2004, the entire contents of which are incorporated herein by reference.

FIELD OF THE INVENTION

The invention relates to an optical viewing system for viewing an object region. The viewing system includes a display unit which has a plurality of controllable display segments which make available light in different colors in order to generate a colored display image which is built up of a plurality of image points. The viewing system further includes a superposition unit which superposes an image, which is made available by the display unit, onto the image of an object region. The viewing system further includes a camera unit which is supplied with an image of display unit and object region superposed by the superposition unit. The camera unit has an image sensor whose light sensitivity is adjustable as a function of time.

The invention further relates to a method for operating an optical viewing system having a display unit which has a plurality of controllable display segments wherein a superposition unit is provided which superposes an image, which is made available by the display unit, onto the image of an object region and the optical viewing system also having a camera unit having an image sensor which supplies an image of the display unit and the object region which is superposed by the superposition unit.

BACKGROUND OF THE INVENTION

An optical viewing system and a method for operating an optical viewing system of the kind mentioned above are known from United States patent application publication US 2001/0024319 A1. Here, a surgical microscope is described which has a unit for reflecting in data. This unit for reflecting data in includes a display with which image data are generated. The image data are superposed on the image of a viewing region via a beam splitter. The superposed image is then supplied to an image sensor for documentation and illustration purposes. To prevent a flickering of the reflected-in data, it is described in United States patent application publication US 2001/0024319 A1 to synchronize the image sensor and the corresponding display.

German patent publication 100 20 279 discloses a stereo microscope having an ocular unit which makes possible the stereoscopic investigation of an object region for a user with a binocular viewing beam path. The ocular unit is combined with a display unit and an image recording unit which make it possible to supply an image, which is reflected into a viewing beam path by means of a beam splitter, to the eye of the viewer as a superposition onto an image of the object region as well as to record this superposed image with an image recording unit.

A surgical microscope having a unit for reflecting in data and having a video camera is described in German utility model registration 299 23 951. This surgical microscope has a first beam splitter cube with which a display image is reflected into a viewing beam path in order to be displayed in a left primary beam path. Furthermore, the surgical microscope has a second beam splitter cube via which the video camera is connected to the viewing beam path. This second beam splitter cube makes possible that the video camera can record object images via a right primary viewing beam path.

As displays for showing image data, so-called modular displays are known which are illuminated with light from one light source or from several separate light sources and which modulate this light pixel for pixel. An example of such displays are so-called LCOS displays. One such LCOS display includes, for example, a nematic fluid crystal which is mounted on a silicon substrate (LCOS=liquid crystal on silicon). Electric conductor paths and component groups are disposed on the silicon substrate. For a corresponding drive, the conductor paths and component groups make it possible to locally adjust the polarization characteristics of the liquid crystal for light and to there quasi continuously tune the polarization characteristics. A polarization beam splitter is usually assigned to such an LCOS display through which the display is illuminated. The polarization beam splitter enables the light reflected by the LCOS display. Alternatively, it is also possible to illuminate the LCOS display via a first pole filter and to supply the light, which is reflected by the LCOS display, to a viewer via a second pole filter. When such an LCOS display is illuminated then the intensity of the light, which is reflected by the LCOS display, can be practically continuously tuned between darkness and maximum reflection via corresponding changes of the polarization characteristics of the nematic liquid crystal.

Furthermore, so-called FLC microdisplays are known as modulating displays which contain a ferro-electric liquid crystal (FLC). This liquid crystal is arranged on a logic circuit on a silicon base which makes it possible to switch back and forth the polarization characteristics of the liquid crystal locally between two binary states in correspondence to the position of individual pixels. When such an FLC microdisplay is illuminated by a polarization beam splitter with polarized light, then the pixels of the FLC microdisplay appear either dark or bright. In order to bring about a changeable luminance impression of a pixel on an FLC microdisplay for a viewer, the polarization state of a pixel is adjusted in a pulsed manner. fThe corresponding pixel brightness results then from an integral actual luminance duration of a pixel in a characteristic time interval. Here, it is utilized that the FLC microdisplay can be driven very rapidly because it is possible to change the polarization state of a pixel on a time scale below 50 µs.

A further example for modulated displays are so-called digital mirror displays (DMD). These displays have a carrier unit on which thousands of small micromirrors are arranged. These micromirrors can be driven individually in order to change their position or orientation. One or several light sources are assigned to such a display. The light of the light sources is reflected by the micromirrors in order to generate an image on a projection surface. The micromirrors correspond to the pixels of an image generated by means of the display. Similar as in an FLC microdisplay, the brightness impression for an image pixel is brought about for a viewer in that the corresponding micromirror is pulse driven in such a manner that it generates light pulses on a suitable projection surface. The actual luminance duration of a pixel over a characteristic time interval is perceived by a viewer as a luminance impression having a defined brightness.

To display colors, it is known to generate, with a corresponding display pixel, the following: a pulse sequence train for a first complementary color; a pulse sequence train for a second complementary color; and, thereafter, a pulse sequence train for a third complementary color.

Furthermore, transmissive displays of the type "color sequential" are known which are combined with two pole filters and are operated in a transmitted-light mode.

Furthermore, so-called emissive displays are utilized as displays for showing image data. These emissive displays generate light pixel for pixel and are usually based on the principle of the vacuum fluorescence or of the field emission. In lieu of the color-sequential display, the color information is here realized via regular spatial arrangement of red, green and blue color filters in front of the individual pixels. The structure boundary of the pixels lies below the resolution limit of the eye. With a corresponding drive of the individual differently colored pixels, it is possible to generate any desired color distribution in an image. Such displays can also be based on organic luminescent diodes, so-called organic light emitting diodes (OLEDs). In such emissive displays, as a rule, similar as in LCoS displays, the intensity of the light, which is outputted by a display pixel, can be quasi-continuously tuned between darkness and a maximum value. OLED microdisplays having SVGA resolution are, for example, offered by the Emagin Company. In this display, each pixel comprises three subpixels having the colors red, green and blue. What is problematic is the comparatively low luminescent density of such displays for the use in a surgical microscope. Monochrome OLED microdisplays having a luminescent density, which is, sufficient for a surgical microscope, are, however, commercially available.

As displays, there are also so-called transmissive LCDs with color filters red-green-blue ahead of each pixel. The operation of these displays corresponds to that of a TFT-LCD monitor for computers.

When these displays are built small (that is, they have an image screen diagonal of less than 25 mm, often also less than 10 mm) and make possible a display with a high information density (for example, QVGA resolution, SVGA resolution, SXGA resolution or even higher resolution), these displays are also characterized as microdisplays.

In surgical microscopes, it is required that the area of surgery be illuminated as brightly as possible in order to obtain a surgical microscope image having good contrast. If a superposed image of the surgical area and a reflected-in display is to be recorded with a camera, for example, for documentation purposes in the surgical microscope, then this camera should be operated in a comparatively short time span for light sensitivity because of the high total image brightness. This comparatively short time span for light sensitivity has the consequence that, in a display wherein the brightness impression of individual pixels over an averaged luminance duration is caused in a characteristic time interval, the camera does not perceive the image, which is shown with the display, or only partially perceives the same because the camera is not sensitive at the time or in the time interval or in the time intervals in which the affected pixels luminesce.

This problem is also present in displays wherein the colored brightness impression of a pixel is caused by the intensity of the light emitted by a pixel insofar as the display is operated in a video mode, in that a display pixel makes available sequential luminescent pulses of a characteristic duration having different colors.

If the time for sensitivity of the camera is not coincident with the time for the luminescent pulses of the display pixels, then the component of the display image in the total image is not at all or only very poorly detected with the camera and therefore chromatic aberrations can occur.

SUMMARY OF THE INVENTION

It is therefore an object of the invention to provide an optical viewing system, especially a surgical microscope, which is equipped with a camera unit and thereby makes it possible to record the image of an object region, on which a reflected-in display image is superposed, with good contrast, especially with correct color, and to so operate an optical viewing system having a device for reflecting in data and image recordation so that an image sensor of the camera unit records the image of an object region as well as a reflected-in image with good contrast and with correct color.

This task is solved with an optical illuminating system of the invention as well as with a method for operating an optical viewing system of the invention.

An optical viewing system of the invention has a display unit which has a plurality of controllable display segments which make available a color pulse sequence train in order to generate a display image which is built up of a plurality of image points. Furthermore, a superposition unit is provided which superposes an image, which is made available by the display unit, onto the image of an object region and there is a camera unit which is supplied with an image of display unit and object region superposed with the superposition unit. The camera unit has an image sensor whose light sensitivity is adjustable as a function of time. The light sensitivity of the image sensor is so matched to the color pulse sequence train that the image sensor can detect at least two pulses of different colors from the color pulse sequence train from a display segment.

In a method for operating an optical viewing system having a display unit, which has a plurality of controllable display pixels and which has a superposition unit, which superposes an image made available by the display unit on the image of an object region, an image of display unit and object region, which is superposed by means of the superposition unit, is supplied to a camera unit having an image sensor. Here, a display pixel of the display unit sequentially emits color pulses and a light sensitivity of the image sensor is so adjusted that the image sensor detects at least two pulses of different colors from the color pulse sequence train from a display pixel.

In this way, it is ensured that a color display information is detected by the image sensor of the viewing system because different colors can be detected from the display.

In a further embodiment of the invention, the colors of the light pulses span a color gamut. Here, a color gamut is understood to be a section of a CIE-diagram as disclosed, for example, in FIG. 5 of the publication "SXGA resolution FLC Microdisplay" by M. Birch et al, SID 2002, ISSN/002-0966X/02/3302-0954. Preferably, the colors of the light pulses are complementary colors in order to make possible an image representation with the display which is as color true as possible. It is ensured that the image sensor detects at least a coarse color information in that at least three color pulses from a color sequence pulse train are detected with the image sensor.

In the optical viewing system, the display unit is so designed that a display segment of the display unit can sequentially make available color pulses of different colors with a time-variable pulse duration which, for example, falls off as a function of time. The image sensor has a time window for light sensitivity which covers at least two color pulses having two, preferably three, different colors. In this way, a display image with color information can be superposed in the viewing beam path onto the image of a viewing region for a viewer and can be detected for documentation purposes with a camera with only insignificant color information loss insofar as the display image portion is concerned.

In a further embodiment of the invention, the display unit is so designed that a display segment of the display unit can make sequentially available color pulses of different colors with variable pulse intensity. The image sensor has time windows for light sensitivity which correspond to the duration of one color pulse and are shifted in time so that sequentially different colors can be scanned. In this way, it is possible to superpose a time-dependently changing display image on a viewing image and to store the same without any color information loss.

In a further embodiment of the optical viewing system, an image repetition rate of the display unit and a repetition rate for the time window of the image sensor have a whole-number common multiple (stated otherwise, the ratio of these rates is a rational fraction). In this way, with a one-time synchronization of display unit and image sensor, the detection of image information from the display unit is ensured with the image sensor.

Likewise, a matching of the light sensitivity of the image sensor to the color pulse sequence of the display can be achieved in that the superposed image from display unit and object region is supplied via a neutral density filter or a diaphragm to the camera unit.

If the optical viewing system is so operated that a display segment of the display unit sequentially sends out color pulses, then a storage of the so generated superposed image is made possible with a comparatively small information loss. Here, a light sensitivity of the image sensor is so adjusted that the image sensor detects at least two pulses of different colors from the color pulse sequence from a display segment.

It is possible that the display segment emits color pulses of different pulse duration and the image sensor detects at least one color pulse train having three different colors, preferably, even two or more color pulse trains having three different complementary colors, if possible.

Preferably, color pulses having different colors are sequentially emitted from a display segment, that is, the colors of neighboring color pulses in a pulse sequence train are different. Alternatively or in addition, the display segment can also emit color pulses of different colors having variable pulse intensity. A time window for light sensitivity of the image sensor is so shifted that the image sensor sequentially scans different colors.

The image sensor in the camera unit of the optical viewing system can be configured as a 1-chip monochromatic CMOS image sensor. Preferably, in this case, a CIE color filter unit is provided which is arranged movably in the illuminating beam path of an illuminating unit. In that a movement of the CIE color filter is matched to the color pulses of the display, then, with the 1-chip monochromatic CMOS image sensor, color information can be detected with respect to the display image as well as also with respect to the object region image supplied to the CMOS image sensor.

In another embodiment of the invention, a control unit can be provided which is assigned to a light source for illuminating light. A brightness signal of a video image, which is generated with the image sensor, is supplied to this control unit in order to so control the brightness of the light source for the illuminating light that the image sensor generates a video image of constant image brightness. In this way, it is possible to always maximally use the dynamic range of the image sensor and therefore to detect image information with good signal-to-noise ratio.

BRIEF DESCRIPTION OF THE DRAWINGS

The invention will now be described with reference to the drawings wherein.

DETAILED OF THE PREFERRED EMBODIMENTS OF THE INVENTION

Figure 1:
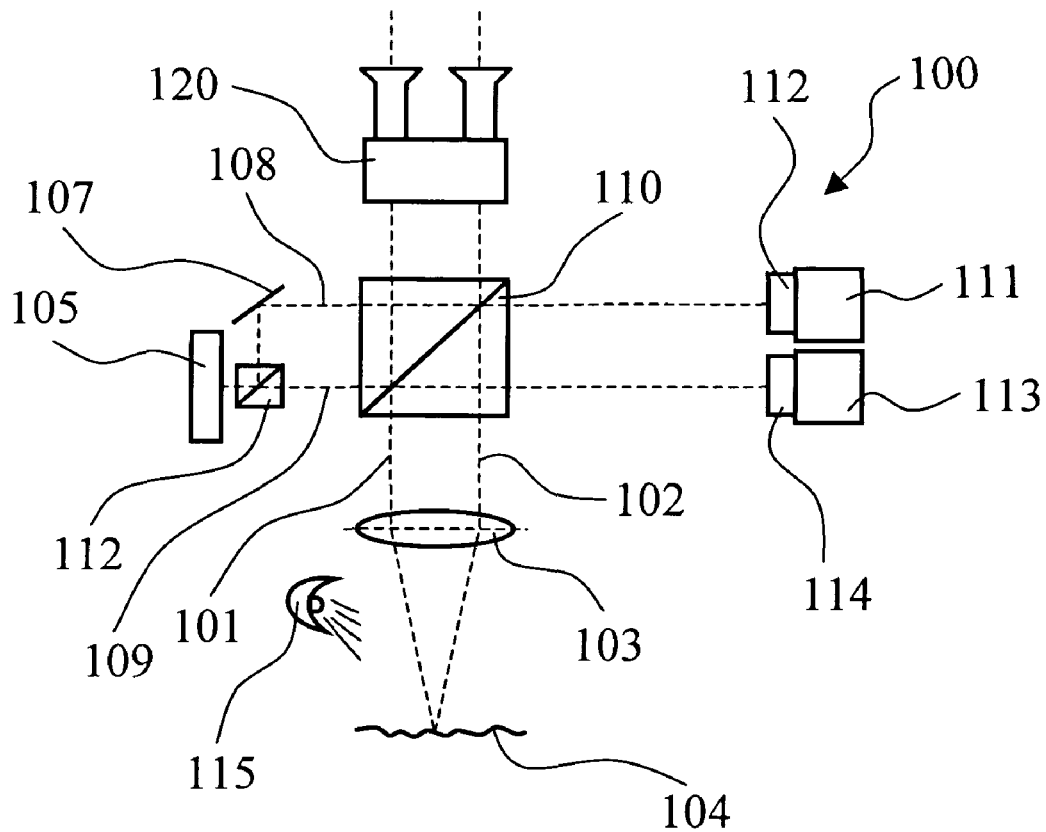
FIG. 1 is a first embodiment for an optical viewing system having a display unit and a camera.

FIG. 1 shows a surgical microscope 100 as an optical viewing system. The surgical microscope 100 makes possible the viewing of an object region 104 with a stereoscopic viewing beam path (101, 102) through a surgical microscope main objective 103. The surgical microscope includes a unit for reflecting in data with the unit having a display 105 which is configured as a one-panel display. A beam splitter cube 112 and a deflecting element 107 are assigned to the display 105 and generate a stereoscopic display beam path 108 and 109.

A beam splitter cube 110 is provided in the surgical microscope and functions as a superposition unit which superposes an image, which is made available by the display functioning as a display unit, onto the image of the object region 104 in the stereoscopic viewing beam path (101, 102) of the surgical microscope. This image can be viewed in a binocular tube 120.

Because of the beam splitter cube 110, the image of the display 105 and the image of the object region 104 are supplied through the microscope main objective 103 with a stereoscopic beam path to a camera unit 111 having image sensor 112 and a camera unit 113 having image sensor 114.

The surgical microscope 100 has an illuminating unit 115 which generates illuminating light for the object region 104. This illuminating light ensures that the object region 104 can be investigated with the greatest possible contrast and brightness.

Because of the high light intensity of the images, which are at the image sensors (112, 114), there results a comparatively short time interval for light sensitivity of these image sensors.

In order to nonetheless ensure that at least no significant information loss of the display information occurs, which is detected with the image sensors, the image sensor 112 is matched to the display 105 and the image sensor 114 is matched to the display 105 in the optical viewing system 100 as will be explained in greater detail hereinafter with respect to FIGS. 2 and 3.

Figure 2:
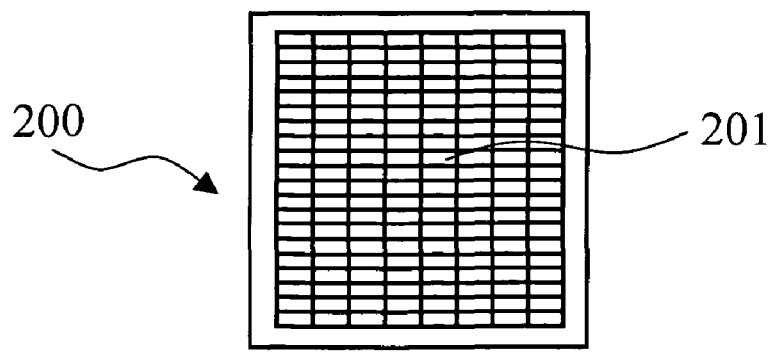
FIG. 2 shows a display unit of the optical viewing system of FIG. 1 with display pixels.

FIG. 2 shows schematically the display 200. The display 200 has display pixels 201 which can be brought to luminescence for an adjustable time interval in one of the complementary colors red (R), green (G) or blue (B). Preferably, the display 200 is a rapidly switchable display.

The display can be designed as a DMD system which has a plurality of micromirrors. Light sources for the complementary colors red (R), green (G) and blue (B) are assigned to such a display. Each micromirror corresponds to one drivable display pixel. By suitably driving the micromirrors and the light sources, each display pixel can be brought to luminesce for an adjustable time interval in one of the complementary colors.

Alternatively, the display can, however, also be an FLC microdisplay or another rapidly switching display.

Figure 3:
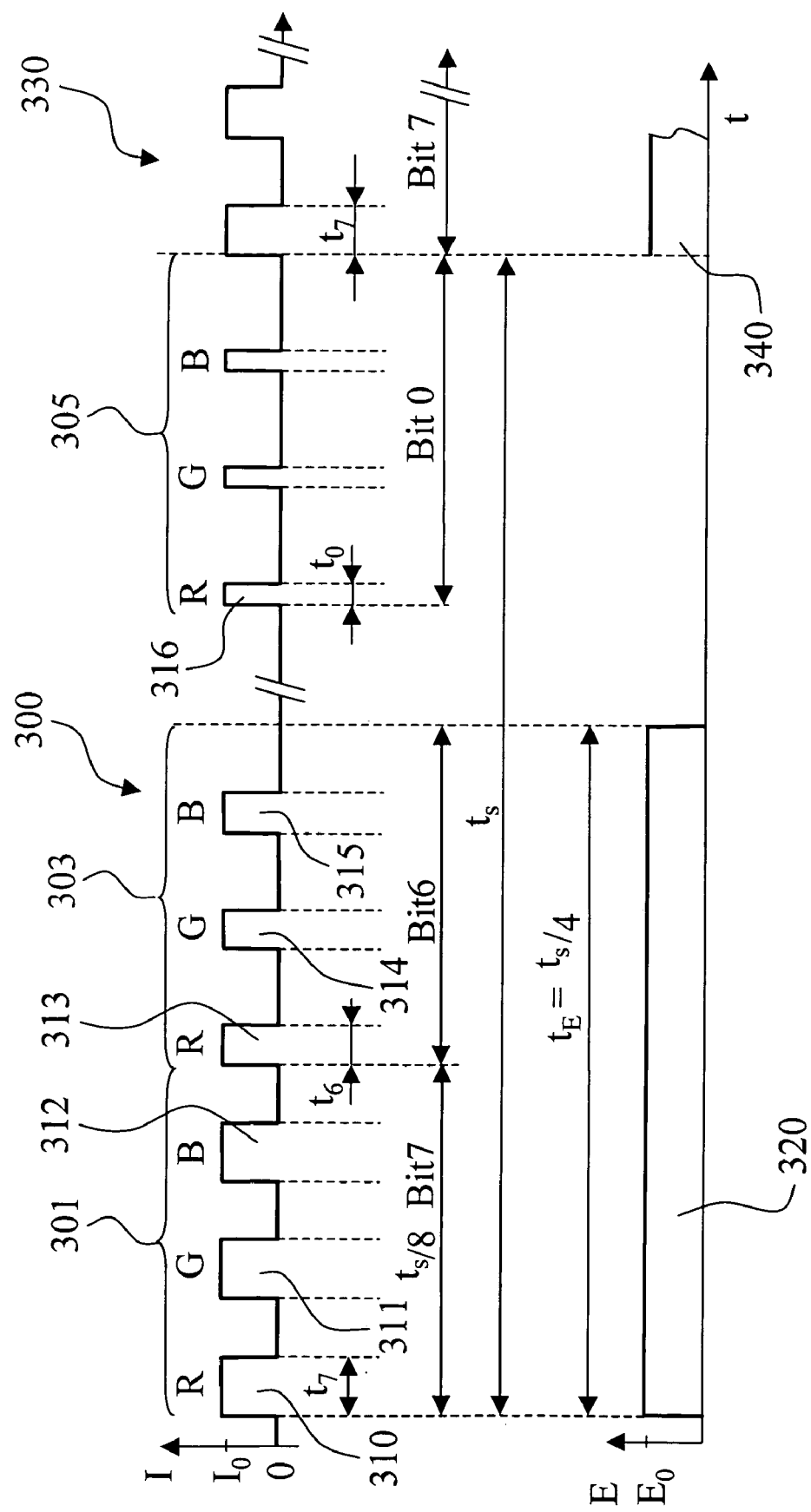
FIG. 3 shows a variation of a color pulse sequence train of a display pixel of the display unit of FIG. 2 and the position of a time window for the light sensitivity of the camera.

FIG. 3 explains an operation of the display 200. The light, which is emitted from the display pixel 201 of FIG. 2, is plotted as a function of time (t) in FIG. 3. The display pixels luminesce with the intensity $I_0$ in the corresponding color or are switched off in correspondence to a drive of the micromirrors of the display and their illumination in the complementary colors R, G, B (red, green, blue).

The color impression and brightness impression, which is brought about for a viewer by a display segment, is therefore based on the fact that, in a control time $t_S$, the display pixel emits a color pulse sequence train 300 of light pulses of decreasing duration with $t_S$ being approximately 20 ms. Light pulses of different colors sequentially change in the particular pulse sequence train. In the special display operating mode, which is explained with respect to FIG. 3, an 8 bit brightness gradation per color is made possible for the image impression for a viewer. A pulse sequence train 330 follows upon the pulse sequence train 300 and so on. Pulse sequence trains such as the pulse sequence train 300 are arranged continuously one behind the other for image generation.

The pulse sequence train 300 is made up of different pulse sequences. Accordingly, for "bit 7", an R, G, B pulse sequence 301 having color pulses 310, 311 and 312 is made available. The duration of the color pulse sequence 301 having complementary colors R, G, B is approximately $t_S/8=2.5$ ms. The color pulse sequence 301 has an R light pulse 310 of the intensity $I=I_0$ and a length $t_7$ of approximately 400 μs. The B light pulse has a corresponding length of equal intensity. In contrast, the intensity of the G light pulse is $I=0$ over the same length. To display another color tone, it is of course possibly necessary to also make available light having a G color tone. A "bit 6" pulse sequence 303 having light pulses 313, 314 and 315 of the characteristic length of approximately $t_6=280$ μs follows upon the "bit 7" pulse sequence. Thereupon, a "bit 5" pulse sequence follows, et cetera, up to "bit 0" pulse sequence 305 having light pulses 316, 317 and 318 wherein the characteristic length of one color pulse amounts to $t_0=160$ μs. Since the control time $t_S$ is approximately 20 ms, the eye of a viewer does not perceive the luminous signal from the display segment as a flickering pulse train because of the inertia of the eye, but as light with a specific color tone.

If an image of a viewing region with greater light intensity is to be detected by the image sensors 112 or 114 of FIG. 1, then it is not possible to maintain the image sensors sensitive over the total control time $t_S$. For example, CCD arrays or CMOS arrays can be used in the image sensors. A possible embodiment for an image sensor is to assign to three CCD arrays respective chromatic splitter prisms which break down a supplied image into corresponding complementary colors. With such image sensors, the three CCD arrays are, as a rule, all exposed and darkened simultaneously.

If, for example, CCD arrays are used in the image sensors, the light quantity, which can be detected with a light-sensitive pixel, is limited by the capacity of the particular detector. For the pixel, only a charge up to a specific upper limit can be collected. If this upper limit is exceeded, then the corresponding CCD array is no longer light sensitive. Corresponding thoughts apply also to other image sensors, for example, image sensors having a chemical film.

To ensure that the display information of display 105 is also detected with the image sensors 112 or 114, the duration $t_E$ of a time window 320 for the light sensitivity of the image sensor 112 or 114 is preferably matched to bit 7 and bit 6 of the display which corresponds to the drive time $t_S/4$ of approximately 5 ms for the display pixel. It is understood that it is possible to expand the time interval for light sensitivity of the display to bit 5 and bit 4 when the brightness of the image of the viewing region permits.

In order to detect color pulses from the pulse sequence train 330, which follows the pulse sequence train 300, the image sensors 112 or 114 have a time window 340 following the time window 320 for light sensitivity. Additional time windows for pulse sequence trains continuously follow the time window 340 with these pulse sequence trains following the pulse sequence trains 300 and 330 shown in FIG. 3.

It is noted that, with reference to FIG. 3, the duration of the color light pulses as well as the duration of the color pulse sequence are explained only by way of example. These quantities are not fixed to the given numerical values. It is also possible that the corresponding brightness gradation be based on another coding. Furthermore, the particular color gradation is not limited to the explained 8 bit gradation; instead, finer or coarser color gradations are also possible. Furthermore, other complementary colors can also be used for the color display in lieu of the complementary colors R, G, B. In the case where it is not striven for to show all colors in the section of a CIE diagram with the display, colors are also possible as color pulses, which are sent out by display pixels, which are not complementary colors to each other. Accordingly, it can, for example, be provided to generate only two different colors with a display pixel.

Figure 4:
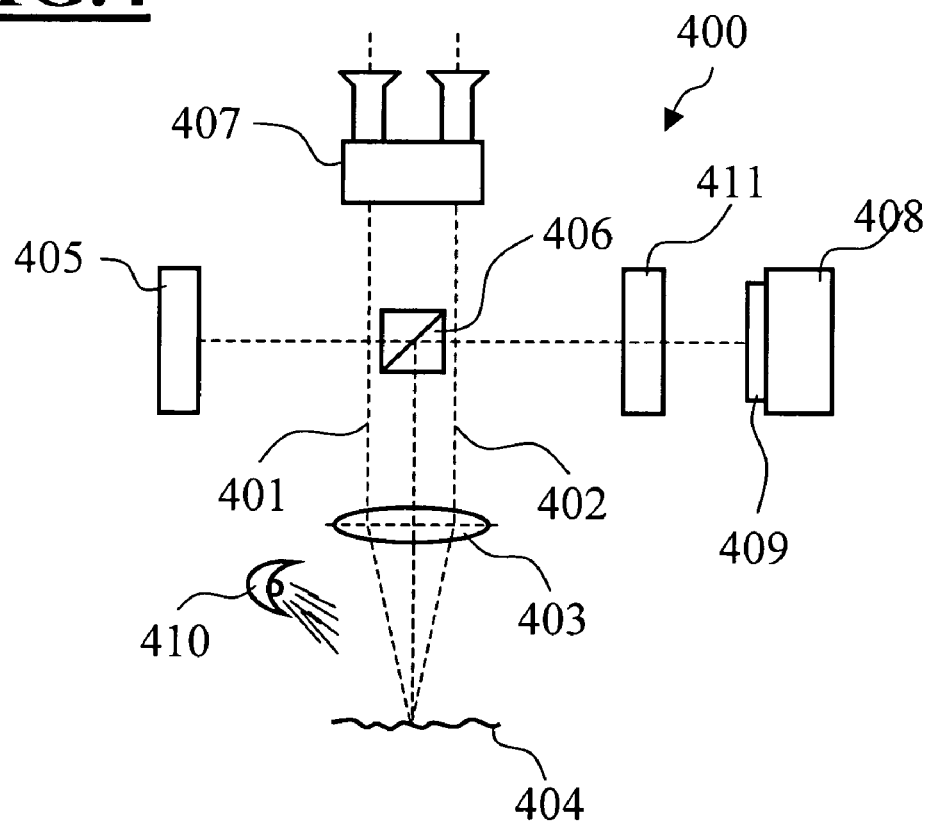
FIG. 4 shows a second embodiment for an optical viewing system having a display unit wherein a neutral density filter is assigned to a camera.

FIG. 4 shows a modified embodiment 400 for a surgical microscope as an optical viewing system with a unit for reflecting in data. With a stereoscopic viewing beam path (401, 402) through a surgical microscope main objective 403, the surgical microscope 400 makes possible the viewing of an object region 404 with a binocular tube 407. A rapidly switching display 405 is provided as a unit for reflecting in data and can be a DMD display or an FLC display. Basically, a slow switching display can also be used as display 405, for example, a nematic LCOS display.

The image of the display is superposed via a beam splitter cube 406 onto the image of the object region 404 and is supplied to a camera unit 408 having image sensor 409. A light source 410 is provided for illuminating the object region 404.

A neutral density filter 411 is mounted ahead of the image sensor 409. This neutral density filter 411 controls the light intensity of the image information impinging upon the image sensor. In this way, it is possible to lengthen the time interval in which the image sensor can be held sensitive also for intense illumination of the object region and, under circumstances, to also shorten the time interval. One such neutral density filter can, for example, be configured mechanically as a wedge filter of variable transmission or can be configured as a rotating filter wheel of variable transmission. It is, however, also possible to configure the neutral density filter electro-optically, for example, as an LC shutter or as a glass plate having an electrochromic layer. Suitable glass plates having electrochromic layers are, for example, manufactured by Gesimat GmbH, Gesellschaft für intelligente Materialien und Technologien, Innovationspark Wulheide, Haus 109, 12555 Berlin. In addition, it is possible to utilize polymer shutters as neutral density filters, for example, the polymer shutter LCP 250 of the Anteryon Company, Zwaanstraat 2a, 5651 CA Eindhoven, Netherlands.

In order to maintain the effect of a neutral density filter, it is alternatively also possible to provide a controllable diaphragm in a pupillary plane of a corresponding imaging beam path of the camera. This diaphragm likewise adjusts the light intensity of the light impinging upon the image sensor.

Figure 5:
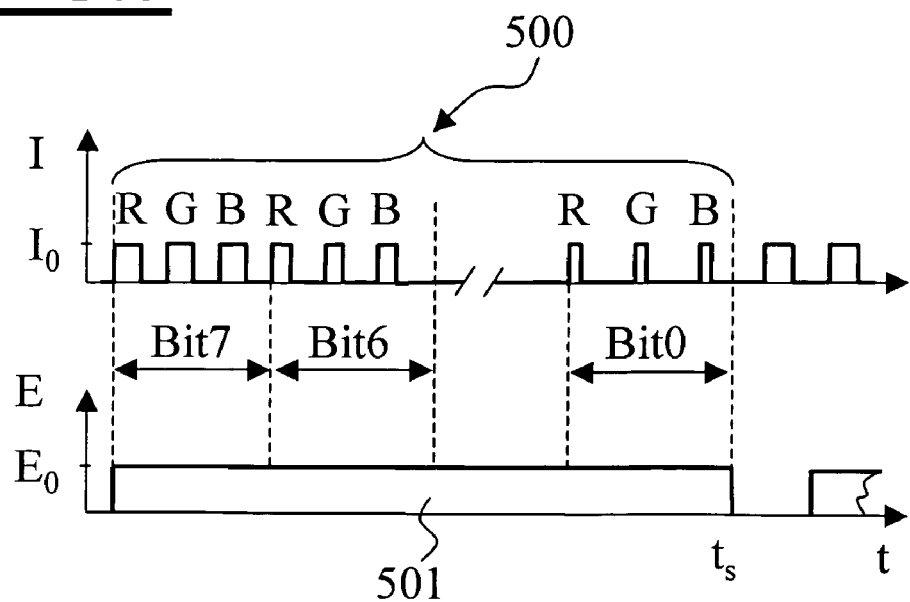
FIG. 5 shows a color pulse sequence train and a time window for light sensitivity of the camera for the optical viewing system of FIG. 4.

As explained with reference to FIG. 5, this causes the image sensor 409 to be exposed for a complete color pulse sequence train 500 with control time $t_S$ over its time window for light sensitivity indicated by reference numeral 501 with the complete image information being detected by display 405. With the arrangement of the neutral density filter 411 ahead of the image sensor 409, a matching of the light sensitivity of the image sensor 409 is therefore possible to the complementary color pulse sequence train of the display.

Figure 6:
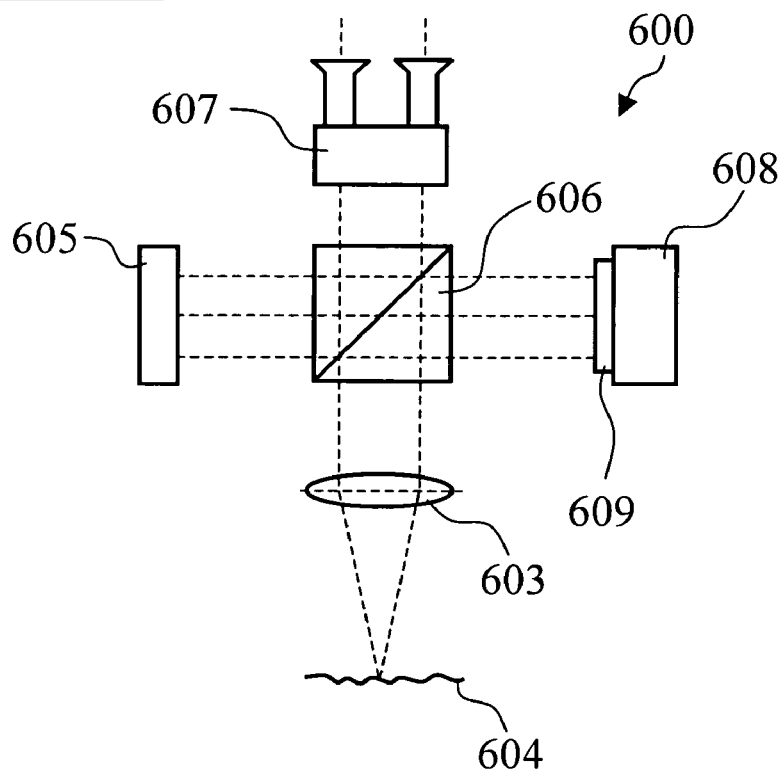
FIG. 6 shows a third embodiment for an optical viewing system having a camera.

FIG. 6 shows a further modified embodiment 600 for a surgical microscope having a unit for reflecting in data. Assembly groups, which correspond to components of the viewing system explained with respect to FIG. 4, are provided with reference numerals increased by 200.

In the surgical microscope 600, a nematic LCOS display is provided as display 605. Compared to the DMD display or FLC display, this display can be switched only comparatively slowly. However, a quasi-continuous tuning of the intensity of the light, which is emitted from a pixel, is made possible.

Figure 7:
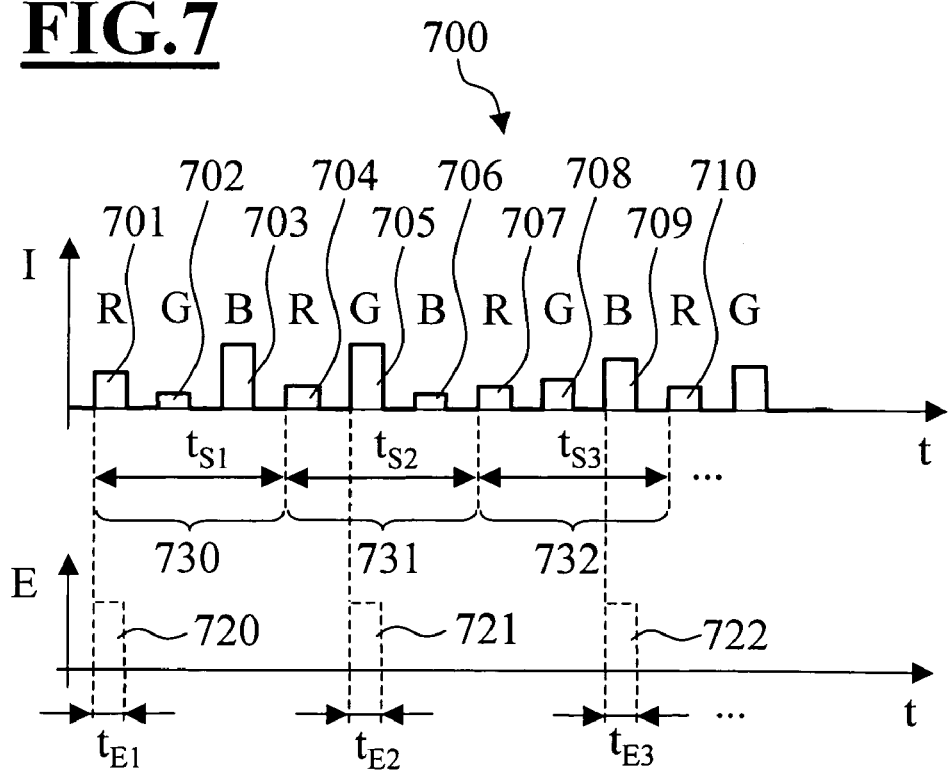
FIG. 7 shows a color pulse sequence train of a display pixel in a display unit of the optical viewing system of FIG. 6 and the position of time windows for light sensitivity of the camera in this viewing system.

In FIG. 7, the intensity of the light, which is emitted from a display pixel, is plotted as a function of time. For an observer, in an image duration interval $t_{S1}$ of approximately 20 ms, a pixel color impression having a color pulse train 730 is generated with the color pulse train 730 comprising three color pulses 701, 702 and 703. The colors of the color pulses are preferably in the complementary colors red (R), green (G) and blue (B). Basically, other colors are, however, also possible. The length of a color pulse is approximately 3.5 ms; the amplitude of a pulse is, however, adjustable. In order to display a moving image or a stationary image, sequential triples of color pulses 701, 702, 703, 704, 705, 706, 707, 708, 709, 710, et cetera are placed in series in the form of color pulse sequences 730, 731, 732, et cetera. These color pulse sequences form a color pulse sequence train 700. As with the surgical microscopes described with respect to FIGS. 1 and 4, it is not possible to maintain the camera 608 with image sensor 609 sensitive when there is high intensity illumination of the object region 604. If a time window for the sensitivity of the camera 608 (whose length is in the order of magnitude of 5 ms as explained with respect to FIG. 3), would be adjusted to the start of the control interval $t_S$, then the consequence would be that only color information in one color is supplied to the image sensor 609 of the camera 608. On the other hand, conventional image sensors such as CCDs can not be switched to be multiply sensitive and be read out for a control time $t_S$ of approximately 20 ms. In order to supply color information in the colors R, G and B to the image sensor 609, the light sensitivity of the image sensor is therefore matched to the color pulse sequence train 700 in such a manner that the image sensor 609 detects pulses of different color with the pulses being in sequence from a display pixel.

Accordingly, a sensitivity time window 720 of the image sensor corresponding to the color pulse "R" is set, for example, in the image duration interval $t_{S1}$ for the time $t_{E1}$. A sensitivity time window 721 of the image sensor is shifted relative to the control time $t_{S2}$ in the image duration interval $t_{S2}$ following the image duration interval $t_{S1}$ and adapted to the color pulse "G". In the next image duration interval $t_{S3}$, the corresponding sensitivity time window 722 lies with respect to the time $t_{E3}$ so that the color pulse blue is detected by the corresponding display pixel. Color pulses 701, 702, 709 are detected therefore by the image sensor from sequential color pulse sequences 730, 731, 732. The colors of these color pulses 701, 705, 709 are different.

It is noted that the sensitivity time windows (720, 721, 722) can also be adjusted by means of a suitably drivable shutter which can be configured to be electro-optical or mechanical. When using a rapid camera, it is possible to record an image with each color pulse 701, 702, 703, et cetera. The color impression, which a viewer has when viewing the display, can be re-established by electronic summation of the successively recorded images.

The use of CMOS image sensors for an image recordation permits to adapt not only the position of a time window but also its length individually to the color pulses of a sequential display.

Figure 8:
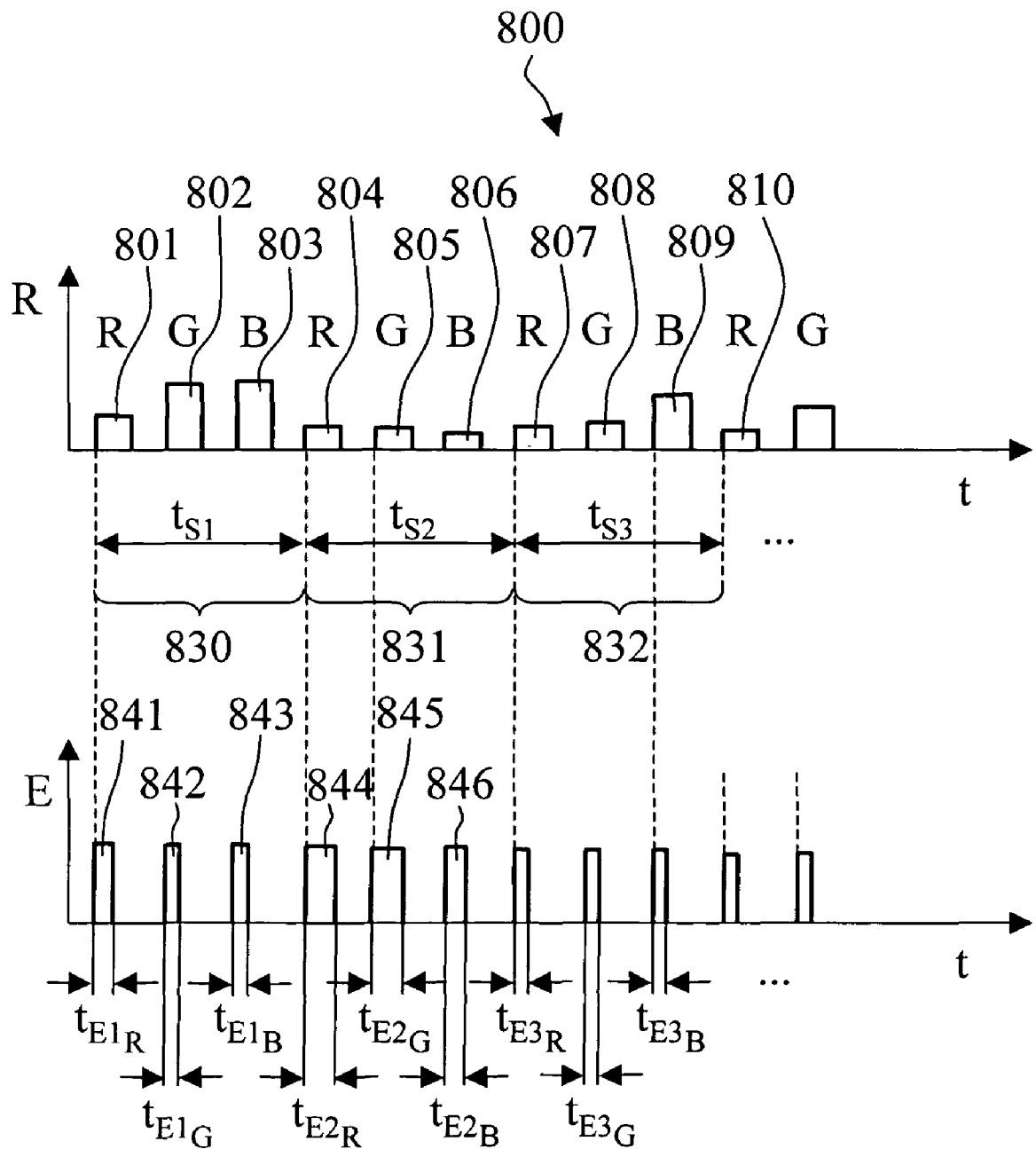
FIG. 8 shows a color pulse sequence train of a display pixel in a display unit of the optical viewing system of FIG. 6 and the position of time windows for light sensitivity in a camera having a CMOS image sensor.

FIG. 8 explains how, with one such CMOS image sensor, the light sensitivity of the image sensor can be adapted to the color pulses of a sequential display. If, for standard image sensors, only the possibility is present to expose an image or half image "in one piece", that is, "without interruption", then the light-sensitive photodiode can be separated from the integration condenser pixel for pixel by means of electronic switches in CMOS image sensors. In this way, a time interval for light sensitivity of a sensor pixel can be adjusted defined by fractions of $\frac{1}{1,000}$ of a second.

Corresponding to FIG. 7, a pixel color impression is generated by a color pulse sequence 830 comprising three color pulses 801, 802, 803 in an image duration interval $t_{S1}$ of approximately 20 ms. The length of a color pulse amounts to approximately 8.5 ms. The amplitude of a pulse is adjustable. To display an image, sequences of color pulses 801, 802, 803, 804, 805, 806, 807, 808, 809, 810 in the form of pulse sequences 830, 831, 832 are placed in series one behind the other. The light sensitivity of the CMOS image sensor is matched to the color pulse sequence train 800 in such a manner that a pixel, which is sensitive for the color red (R), is exposed over the time interval $t_{E1_R}$. In this time interval, preferably an exposure of pixels, which are sensitive for the colors green (G) or blue (B), does not take place. In the time interval 842 of duration $t_{E1_G}$, an exposure of CMOS image sensor pixels takes place which are sensitive for the color green (G). Here, the remaining pixels, which are sensitive for the colors red and blue, are maintained non-sensitive. Finally, in the time interval 843 of duration $t_{E1_B}$, the pixels, which are sensitive for the color blue, are switched sensitive while the pixels, which are sensitive for red and green, are insensitive to light.

The length of the time intervals for exposure of the light-sensitive pixels of the CMOS image sensor can be adapted to the intensity of the color pulses of the display. Such an adaptation was undertaken for the time duration interval $t_{S2}$: the length of the exposure time intervals 844, 845 and 846 over the times $t_{E2_R}$, $t_{E2_G}$ or $t_{E2_B}$ was increased because the intensity of the green color pulse 805 is comparatively low in this exposure time interval. However, it is possible to control the length of the exposure time intervals for the image sensor also based on other color pulses or to adjust the exposure time intervals in correspondence to an instantaneous display brightness.

Figure 9:
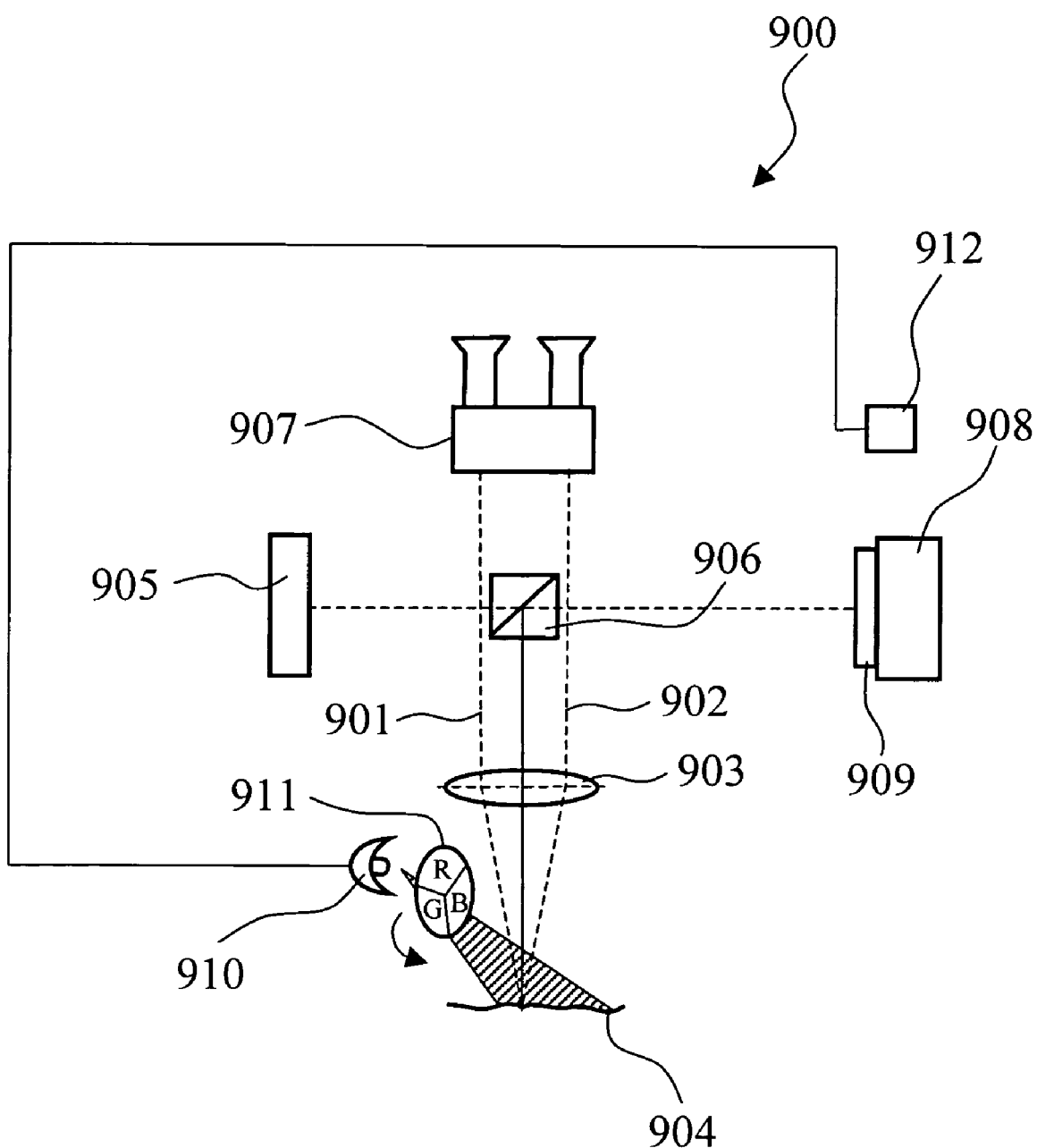
FIG. 9 shows a fourth embodiment for an optical viewing system wherein a camera is provided with a 1-chip monochromatic CMOS image sensor; and, FIG. 10 shows a color pulse sequence train of a display pixel in a display unit of the optical viewing system of FIG. 6 and the position of time windows for light sensitivity of the monochromatic CMOS image sensor.

FIG. 9 shows a further modified embodiment 900 for a surgical microscope having a unit for reflecting in data. Component assemblies, which correspond to components of the viewing system explained with respect to FIG. 6, are provided with reference numerals increased by 300.

The surgical microscope 900 includes a 1-chip monochromatic CMOS image sensor 909. Such a monochromatic image sensor 909 is sensitive for light of the visible spectral range. The light from display 905 and the light from the object region 904 is superposed onto the image sensor 909 via a beam splitter 906. A CIE color filter wheel 911 is assigned to the illuminating unit 910 of the surgical microscope 900. The filter wheel contains three CIE color filters which are moved via a rapid rotation of the wheel 911 through the illuminating beam path of the surgical microscope 900. The movement of the CIE color filter wheel 911 is coupled to the image sensor 909 which is explained in detail with respect to FIG. 10.

Figure 10:
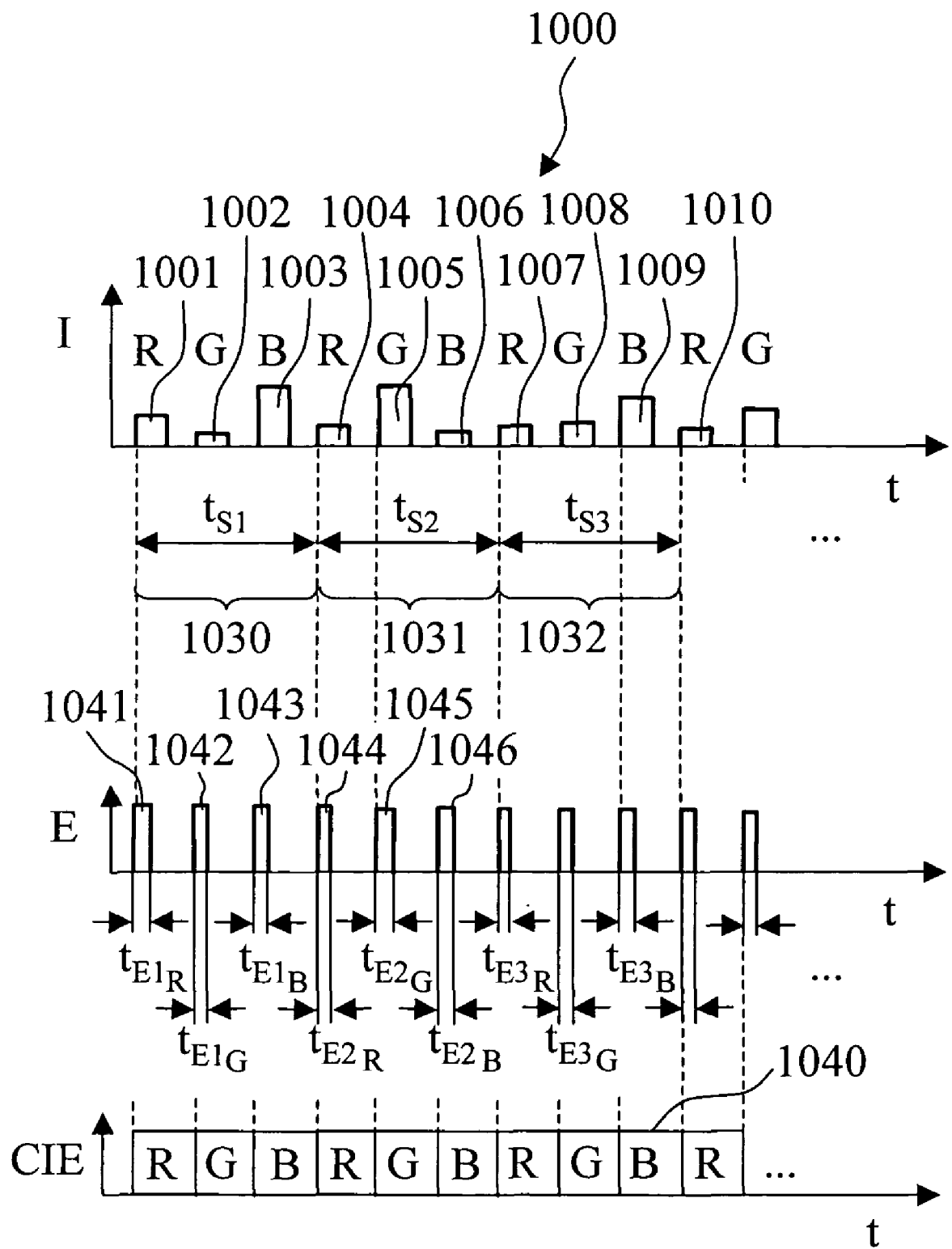

In FIG. 10, the intensity of the light, which is emitted by a display pixel as a function of time, is plotted. For a viewer, a pixel color impression is generated with a color pulse train 1030, which comprises three color pulses 1001, 1002 and 1003, in an image duration interval $t_{S1}$ of approximately 20 ms. The colors of the color pulses are maintained in different complementary colors, preferably, in the complementary colors red (R), green (G) and blue (B). The length of a color pulse is approximately 3.5 ms; the amplitude of a pulse is, however, adjustable. To display a movable image or a stationary image, sequential triples of color pulses 1001, 1002, 1003, 1004, 1005, 1006, 1007, 1008, 1009, 1010, et cetera are placed in series with each other in the form of color pulse sequences 1030, 1031, 1032, et cetera. The color pulse sequences form a color pulse sequence train 1000.

The CIE color filters are moved through the illuminating beam path of the surgical microscope in synchronism with the sequence color pulses 1001, 1002, et cetera of the display 905 from FIG. 9 in correspondence to the graph 1040 in FIG. 10.

An exposure of the monochromatic 1-chip CMOS sensor from

FIG. 9 in controllable time intervals 1041, 1042, 1043, 1044, 1045, 1046 of the duration $t_{E1_R}$, $t_{E1_G}$, $t_{E1_B}$, $t_{E2_R}$, $t_{E2_G}$, $t_{E2_B}$, et cetera likewise takes place synchronously with the movement of the color filter and with the pulses of different colors of the display 905.

It is possible to compute a color image from the light signals, which are recorded with the monochromatic 1-chip CMOS image sensor, from the knowledge of the time-dependent position of the color pulses 1001, 1002, . . . of the display 905 of FIG. 9 and of the CIE filter disposed in the illumination beam path over the corresponding time interval. The color image corresponds to the perception of the eye of the viewer which views through the tube 907 of the surgical microscope 900 of FIG. 9.

In order to operate the camera always in the range of a maximum exposure time interval, it can be provided to adjust the power of the light source, which is utilized in the corresponding surgical microscope, for illuminating light to the available dynamic region of the sensor of the camera. For this purpose, in the optical viewing system 900 in FIG. 9, a control unit 912 is provided which is connected to the image sensor 909 and the light source 910. This control unit 912 controls the brightness of the light source for illuminating light 910 such that the image sensor 909 always generates a video image of constant image brightness. For this purpose, a brightness signal of a video image, which is generated by the image sensor 909, is supplied to the control unit 912. Based on this signal, the brightness of the light source for the illuminating light 910 is adjusted.

It is further possible to couple the time intervals for the light sensitivity of the image sensor pixel to the brightness of the additionally detected image of a surgical region. For this purpose, for example, the brightness of the imaged surgical region is detected as an input quantity. Alternatively, it is, however, also possible to apply the power of the utilized surgical microscope light source as an input signal for an exposure time interval control.

CMOS image sensors not only make possible the individual adjustment of the sensitivity of a display pixel, these image sensors can also be designed for a high dynamic range with respect to the brightness of a detected image. In this way, the light sensitivity of the image sensor can also be adjusted to a fixed maximum value, which corresponds, for example, approximately to the time interval $t_{E2_{ges}}$ with respect to FIG. 8, or with respect to FIG. 5, approximately to the time interval ts.

Generally speaking, the image sensor is therefore read out periodically at a lower rate than image information is periodically generated with the corresponding display. Accordingly, a synchronization of the indication on the display and camera takes place. Accordingly, the field frequency (color field rate) of the display cannot be adjusted to the conventional frequency of 360 Hz (for NTSC video standard) or 300 Hz (for PAL video standard); instead, the field frequency can only be adjusted to ¾ of this frequency, that is 270 Hz or 225 Hz. In this way, the complementary colors (from which the display image is built up) are at least supplied once to the image sensor 609 of the camera 608 via three image recordings one after the other. With the camera, a color image detection of the image, which is shown on the display, is possible. However, the images of the display are detected with information loss because all complementary colors are detected in three control time intervals together. A reproduction of the recorded display images, which correspond to the recording, is therefore possible in this case only with one third of the video frequency used for the display. It is understood that also other sequences for the time windows for sensitivity of the display or the light pulses of the display pixels are conceivable. A comparatively simple synchronization of display indication and camera is possible in that the pixel repetitive rate from the display and the rate for light sensitivity of the image sensor are so set that they have a common multiple, that is, that the ratio of these rates is a rational number.

It is understood that the foregoing description is that of the preferred embodiments of the invention and that various changes and modifications may be made thereto without departing from the spirit and scope of the invention as defined in the appended claims.

What is claimed is:

1. A surgical microscope for viewing a region of an object, the surgical microscope defining a beam path and comprising:
   a viewing unit arranged on said beam path;
   a reflecting-in display unit having a plurality of controllable display pixels which provide light in different colors in order to generate a display image which is built up from a plurality of image points and is reflected toward said beam path;

a superposition unit for superposing said display image onto an image of said region of said object to form a superposed image in said beam path to permit viewing of said superposed image at said viewing unit;

a camera unit for receiving said superposed image from said superposition unit;

said camera unit including an image sensor having a light sensitivity;

each one of said display pixels being adapted to generate a pulse sequence train from a plurality of light pulse sequences having light pulses of different colors; and, said light sensitivity of said image sensor being matched to said pulse sequence train so as to permit said image sensor to detect at least two light pulses of different colors (R, G, B) from said pulse sequence train.

2. The surgical microscope of claim 1, wherein the different colors of the light pulses span a color space.

3. The surgical microscope of claim 2, wherein the different colors of the light pulses are complementary colors (red, green, blue).

4. The surgical microscope of claim 3, wherein at least three light pulses of different complementary colors are detected from a display pixel.

5. The surgical microscope of claim 1, wherein:
the display unit is so configured that a display pixel of the display unit can make available sequential color pulses in different colors (R, G, B) and with time-dependent variable pulse duration ($t_7, t_6, \ldots, t_0$); and,
the image sensor has a time window for light sensitivity which covers at least two color pulses with two different colors (R, G, B).

6. The surgical microscope of claim 5, wherein the color pulses have a variable pulse intensity.

7. The surgical microscope of claim 5, wherein the color pulses have a constant pulse intensity.

8. The surgical microscope of claim 7, wherein the image sensor has a time window for light sensitivity which covers at least two color pulse sequences with color pulses which are held in different colors (R, G, B).

9. The surgical microscope of claim 1, wherein:
the display unit is so configured that a display segment of the display unit can make available sequential color pulses of different colors (R, G, B); and,
the image sensor has time windows wherein the image sensor is light sensitive for times ($t_{E1}, t_{E2}, t_{E3}$) which correspond to the duration of a color pulse and lie in time so that sequentially different complementary colors (R, G, B) are scanned.

10. The surgical microscope of claim 9, wherein the ratio of a pixel repetitive rate of the display unit and a repetitive rate for the time for light sensitivity of the sensor is a rational fraction.

11. The surgical microscope of claim 1, wherein the superposed image from display unit and object region is supplied to the camera unit via a neutral density filter or a diaphragm.

12. The surgical microscope of claim 1, wherein a 1-chip monochromatic CMOS image sensor is provided in the camera unit.

13. The surgical microscope of claim 12, wherein an illuminating unit is provided with a CIE color filter wheel.

14. The surgical microscope of claim 1, wherein a control unit, which is assigned to a light source for illuminating light, is provided and a brightness signal of a video image, which is generated with the image sensor, is supplied to the control unit in order to so control the brightness of the light source for illuminating light that the image sensor generates a video image of constant image brightness.

15. The surgical microscope of claim 1, wherein said optical viewing system defines an optical axis along which said region of said object can be viewed; and, said superposition unit is a beam splitter mounted on said optical axis for superposing said display image onto said image of said region of said object to form said superposed image received by said camera unit.

16. The surgical microscope of claim 1, wherein said reflecting-in display unit is a DMD-device.

17. A method for operating a surgical microscope defining a beam path and including a reflecting-in display unit having a plurality of controllable display pixels to generate a display image; a superposition unit for superposing said display image onto an image of said region of said object to form a superposed image in said beam path; a camera unit for receiving said superposed image; and, said camera unit including an image sensor; the method comprising the steps of:

causing a display pixel of said plurality of controllable display pixels to sequentially emit color pulses in a color pulse sequence train; and, utilizing said image sensor to detect at least two color pulses of different color from said color pulse sequence train wherein color pulses of different pulse duration ($t_7, t_6, \ldots, t_0$) are sent out in light pulse sequences which follow one upon the other and the image sensor detects at least one light pulse sequence with three different colors (R, G, B), and wherein the ratio of a rate, with which color pulses are sent out at a rate with which the image sensor scans different colors, is a rational number.

18. The method of claim 17, wherein color pulses, which follow one after the other in a light pulse sequence, are transmitted with different colors.

19. The method of claim 17, wherein the image sensor detects at least two light pulse sequences with different colors (R, G, B).

20. The method of claim 17, wherein color pulses of different colors (R, G, B) are sent out with variable pulse intensity and the image sensor sequentially scans different colors.

21. The method of claim 17, wherein a CIE color filter arrangement is moved in an illuminating beam path for illuminating an object region; and, the movement of the CIE color filter arrangement is matched to the sequential color pulses of a display pixel of the display unit.

22. An optical viewing system for viewing a region of an object along a beam path, the optical viewing system defining an optical axis for said beam path and comprising:

a tube for viewing said region along said optical axis;

a main objective arranged on said optical axis;

a reflecting-in display unit having a plurality of controllable display pixels which provide light in different colors in order to generate a display image which is built up from a plurality of image points and is reflected toward said beam path;

a beam splitter disposed on said optical axis between said tube and said objective;

said beam splitter being mounted to receive said display image and to superpose said display image onto an image of said region of said object to form a superposed image in said beam path viewable by an operator through said viewing tube;

a camera unit for receiving said superposed image;

said camera unit including an image sensor having a light sensitivity;

each one of said display pixels being adapted to generate a pulse sequence train from a plurality of light pulse sequences having light pulses of different colors; and, said light sensitivity of said image sensor being matched to said pulse sequence train so as to permit said image sensor to detect at least two light pulses of different colors (R, G, B) from said pulse sequence train.

* * * * *

UNITED STATES PATENT AND TRADEMARK OFFICE
CERTIFICATE OF CORRECTION

| | | |
|---|---|---|
| PATENT NO. | : 7,924,307 B2 | Page 1 of 1 |
| APPLICATION NO. | : 10/918387 | |
| DATED | : April 12, 2011 | |
| INVENTOR(S) | : Helge Jess et al. | |

It is certified that error appears in the above-identified patent and that said Letters Patent is hereby corrected as shown below:

Column 2:
Line 41: delete "fThe" and substitute -- The -- therefor.

Column 3:
Line 25: delete "is," and substitute -- is -- therefor.

Column 6:
Line 36: delete "DETAILED" and substitute -- DESCRIPTION -- therefor.

Signed and Sealed this
Seventh Day of June, 2011

David J. Kappos
*Director of the United States Patent and Trademark Office*